United States Patent Office 2,894,872
Patented July 14, 1959

2,894,872

CYCLOHEXIMIDE β-KETO-CARBOXYLIC ACID ESTERS

Maxton F. Murray, Kalamazoo Township, Kalamazoo County, Mich., assignor to The Upjohn Company, Kalamazoo, Mich., a corporation of Michigan No Drawing. Application April 17, 1957
Serial No. 653,292

16 Claims. (Cl. 167—33)

This invention relates to novel compounds, compositions, and processes. More particularly, it is directed to esters of cycloheximide and lower-beta-keto hydrocarboncarboxylic acids, to a process for preparing said esters, and to their use for preventing and arresting the infestations of fungi, insects, and other pestiferous organisms which are economically harmful to man.

The compounds of the invention can be represented by the following general structural formula:

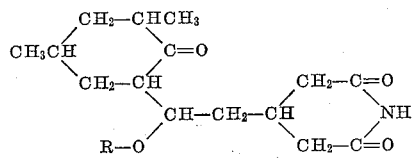

wherein R is an acyl group derived from a lower-beta-keto hydrocarboncarboxylic acid containing not more than ten carbon atoms.

It is known that cycloheximide, 3-[2-(3,5-dimethyl-2-oxocyclohexyl)2-hydroxyethyl]glutarimide, is effective for the control of many plant diseases caused by fungi; e.g., it is effective in the control of cherry leaf spot, cereal grain rusts, bean anthracnose, apple scab, and various turf diseases such as Merion bluegrass rust. The active compound can be isolated from fermentative beers resulting from a culture of *Streptomyces griseus* on a suitable nutrient medium according to methods described in United States Patents 2,574,519 and 2,612,502.

It is an object of the invention to provide novel chemical compounds for the control of pest organisms. Another object is to provide novel chemical compounds that are less phytotoxic than cycloheximide. A further object is to provide fungicidal agents which are systemic and which exert their fungi-toxic activity over a prolonged interval after application. Other objects of the invention will become apparent to persons skilled in the art as the following description proceeds.

It has now been found that the lower-beta-keto hydrocarboncarboxylic acid esters of cycloheximide are much less phytotoxic than cycloheximide itself, yet they possess equivalent activity against many of the pest organisms controlled by cycloheximide. Moreover, these lower-beta-keto esters are systemic plant fungicides. Consequently, they can be applied to growing plants and subsequent growth is protected from fungal disease. This superiority is of great significance when plants are growing rapidly, because control of infection can be maintained in spite of longer intervals between spray applications. Systemic activity is otherwise advantageous, because the compounds are adaptable to methods of application that are less exacting than thorough coverage by sprays, and which require less expensive equipment.

In the control of cherry leaf spot caused by the organism *Coccomyces hiemalis* Higgins, compounds of the invention produced as effective eradication as cycloheximide, but were much less phytotoxic and gave systemic protection. In another comparative test with cycloheximide, the acetoacetate ester exhibited substantially complete control of leaf rust on wheat (*Puccinia rubigovera tritici*) without significant phytotoxicity. When tested for control of *Alternaria solani* on tomato plants, compounds of the invention produced slight toxic injury at a concentration of 12.5 parts per million while cycloheximide produced severe injury at the same concentration. Surprisingly, these compounds have been found to be effective against microorganisms causing serious damage to growing pineapple plants; i.e., *Phytophthora cinnamomi* (heart rot-root rot), *Phytophthora parasitica* (heart rot), and *Pythium* sp. (root rot). Phytotoxicity was negligible at the effective dosages, and plant vigor was enhanced.

In carrying out the invention, the lower-beta-keto hydrocarboncarboxylic acid esters of cycloheximide can be formulated with aqueous or non-aqueous carriers for application of foliage, seeds, or other parts of plants. Compositions suitable for root or bole infusion can also be made. Since the compounds of the invention are very slightly soluble in water, it is desirable to first dissolve the compound in a water-miscible solvent such as dimethylformamide, dimethylacetamide, dimethyl sulfoxide, acetonitrile, cyclohexanone, or a similar solvent. Dimethylformamide, dimethylacetamide and dimethyl sulfoxide are preferred, because the lower-beta-keto esters of cycloheximide are highly soluble therein. Such concentrated solutions can then be admixed with a suitable volume of an aqueous medium to give a mixture of any desired concentration. For the most part, mixtures containing very low concentrations of the active ingredient are effective. Hence, the concentration of lower-beta-keto ester can range from about 0.5 to about 100 parts per million, or even higher, such as up to the practical limits of maintaining a homogeneous dispersion of the components. For example, a concentrate comprising one percent (by weight) of ester dissolved in a water-miscible solvent of the kind noted above can be admixed with an aqueous medium in the proportions of one teaspoonful (5 cc.) of concentrate with one gallon of medium to give a mixture containing thirteen to fourteen parts of active ingredient per million parts of water. One pint of a one percent concentrate mixed with 100 gallons of water provides about twelve parts per million of active ingredient. Similarly, more concentrated solutions of an active ingredient in a water-miscible solvent can be incorporated with an appropriate quantity of aqueous medium to give a preparation of desired concentration. According to the foregoing procedure, the lower-beta-keto esters of cycloheximide can be formulated and can be applied as foliar sprays, as compositions for root or bole infusion, or as mixtures for treatment of seeds. In the case of sprays for application to cereal grains and grasses for prevention of rusts, it is advantageous to employ cyclohexanone as solvent in making up the concentration and to include in the final spray mixture a small amount (about 0.25 to 1.0 percent by volume) of a non-phytotoxic oil such as summer oil.

It is usually desirable, particularly in the case of foliar spray formulations, to include adjuvants such as wetting agents, spreading agents, dispersing agents, stickers and adhesives, and the like in accordance with usual agricultural practices. Anionic, cationic, and non-ionic surfactants can be used. Suitable surfactants include alkyl sulfates and sulfonates, alkylarylsulfonates, sulfosuccinate esters, polyoxyethylene sulfates, polyoxyethylene sorbitan monolaurate, alkylarylpolyether sulfates, alkylarylpolyether alcohols, alkyl quaternary ammonium salts, sulfated fatty acid esters, sulfated fatty acid amides, glycerol mannitan laurate, polyalkylether condensates of fatty acids, ligninsulfonates, and the like.

If desired, the active material can be compounded with a powder carrier. Thus lower-beta-keto esters of cycloheximide can be milled or otherwise admixed with an inert solid carrier such as talc, pyrophyllite, Georgia clay, bentonite, or mixtures thereof, with or without adjuvants such as those mentioned above to provide compositions which can be used for treating seeds, or for the dusting of plants, or for preparing aqueous sprays for application to foliage. A suitable formulation is obtained by milling and blending 434.5 pounds of Georgia clay, 4.5 pounds of Triton X–100 (an alkylarylpolyether alcohol) as a wetting agent, nine pounds of Daxad 27 (polymerized sodium salt of substituted benzoid long-chain alkyl sulfonic acid) as a dispersant and about 5.5 pounds of a lower-beta-keto ester of cycloheximide. The resulting mixture has the following percentage (by weight) composition.

| | Percent |
|---|---|
| Lower-beta-keto ester of cycloheximide | 1.2 |
| Triton X–100 | 1 |
| Daxad 27 | 2 |
| Georgia clay | 95.8 |

This formulation when added to water at one pound per hundred gallons gives a spray mixture containing about thirteen to fourteen parts per million of active ingredient.

While the compounds of the invention are particularly useful as plant disease fungicides and have been more particularly described above in connection therewith, they are likewise useful generally in controlling fungi which commonly infest and attack plant and animal matter either in its natural or fabricated state, e.g., rawhide, glue, gelatin, leather, cork, wood, cotton fabric, cordage, ink, casein products, etc. Moreover, the compounds of the invention have been demonstrated to possess insecticidal properties, as well as activity against other pest organisms.

The compounds of the invention can be prepared by a transesterification reaction involving equimolar amounts of cycloheximide and a lower-alkyl ester, such as the methyl or ethyl ester, of the desired lower-beta-keto hydrocarboncarboxylic acid. Ordinarily it is convenient to employ an excess, such as about a two-fold or three-fold excess, of the keto ester, in which case the excess serves as a solvent or diluent for carrying out the reaction; other solvents or diluents such as benzene, toluene, xylene, and the like can be employed. The reaction can be carried out at temperatures ranging from about fifty degrees centigrade to about 200 degrees centigrade, steam bath temperatures of about 90–95 degrees centigrade ordinarily being preferred because of convenience.

If desired, the removal of alcohol formed by transesterification may be facilitated by bubbling a stream of inert gas such as nitrogen through the reaction mixture during the heating period, but this is not necessary. When the reaction has been completed, the excess beta-keto ester reactant is removed by distillation under a partial vacuum. The viscous, oily residue is dissolved in a suitable inert solvent such as benzene and the lower-beta-keto hydrocarboncarboxylic acid ester of cycloheximide is recovered by known methods such as solvent extraction, crystallization, chromatographic separation, etc.

Numerous beta-keto esters of the kind noted above are suitable as starting materials for the practice of the invention, and such esters can be prepared by methods known in the art [see Hauser and Hudson, Organic Reactions 1: pp. 266–302 (1942)]. Some examples of such beta-keto esters are: ethyl acetoacetate, methyl acetoacetate, propyl acetoacetate, ethyl α-propionylpropionate, ethyl α-butyrylbutyrate, ethyl α-isobutyrylisobutyrate, ethyl α-n-valeryl-n-valerate, ethyl propionylacetate, ethyl n-butyrylacetate, ethyl n-valerylacetate, ethyl α-formylpropionate, ethyl α-formylisobutyrate, ethyl benzoylacetate, dimethyl β-oxoglutarate, 2-carbethoxycyclopentanone, 2-carbethoxycyclohexanone, $\Delta^2$-6-carbethoxycyclohexenone, $\Delta^3$-2-carbethoxycyclopentenone, ethyl α-acetylisobutyrate, ethyl α-n-butyrylisobutyrate, methyl α-isobutyrylisobutyrate, and the like.

The following examples are illustrative of the process and products of the present invention, but are not to be construed as limiting.

EXAMPLE 1

*Preparation of cycloheximide acetoacetate*

Two hundred and fifty (250) milliliters of ethyl acetoacetate containing 70.5 grams of cycloheximide was heated on a steam bath for 4½ hours while nitrogen gas was bubbled through the solution. The excess ethyl acetoacetate was then removed by distillation under vacuum. The viscous, oily residue was dissolved in 220 milliliters of benzene, and isopropyl ether was added until the solution became cloudy (about 330 milliliters were required). The mixture was seeded and allowed to stand for two hours before being refrigerated at minus ten degrees centigrade. Crystal formation was allowed to continue overnight. The next day, the solids were gummy, and the mixture was kept at room temperature for several hours after which the crystalline material was no longer gummy. It was recovered by filtration, washed with isopropyl ether and dried at fifty degrees centigrade under partial vacuum. The product weighed 65.6 grams and gave a melting point of 85–89 degrees centigrade (somewhat cloudy to 95 degrees).

The product was then dissolved in 125 milliliters of methanol at room temperature and allowed to stand. Precipitation occurred in above five minutes and resulted in a semi-solid mass. Another 125 milliliters of methanol were added and the mixture was filtered. This product was washed with methanol and dried at fifty degrees centigrade under partial vacuum. The resulting crude cycloheximide acetoacetate methyl alcoholate weighed 32.0 grams (35 percent) and gave a melting point of 67–70 degrees centigrade (upon solidification it remelted at 100–110 degrees centigrade). An analytical sample was obtained by dissolving one gram of the methyl alcoholate in forty milliliters of 1:1 methanol and isoproyl ether, and then concentrating the solution to one-half volume. After cooling, the solids were filtered, washed with isopropyl ether and dried at room temperature under partial vacuum. The melting point was 66.5–69.5 degrees centigrade (the material upon resolidification melted at 110 degrees centigrade).

*Analysis.*—Calc'd for $C_{19}H_{27}NO_6 \cdot CH_3OH$: C, 60.43; H, 7.86; N, 3.52. Found: C, 60.30, 60.63; H, 7.70, 7.71; N, 3.88.

The specific rotation, $[\alpha]_D$, was plus 18 degrees (dimethyl sulfoxide).

In another run, the crude product which melted at 85–89 degrees centigrade with cloudiness to 95 degrees centigrade was recrystallized from a 1:2 mixture of benzene and isopropyl ether. There was thus obtained cycloheximide acetoacetate having a melting point of 110.5–112 degrees centigrade.

Calc'd for $C_{19}H_{27}NO_6$: C, 62.45; H, 7.45; N, 3.83. Found: C, 62.78; H. 7.02; N, 3.83.

Specific rotation, $[\alpha]_D$, was plus 20 degrees (dimethyl sulfoxide).

The melting point of a mixture of either of the above products (cycloheximide acetoacetate or its methyl alcoholate) with cycloheximide was depressed.

EXAMPLE 2

*Preparation of cycloheximide benzoylacetate*

One mole (192.2 grams) of ethyl benzoylacetate and 70.7 grams (0.25 mole) of cycloheximide were mixed and heated together on a steam bath for eight hours while nitrogen gas was bubbled through the solution.

The excess ethyl benzoylacetate was distilled at fifty microns pressure while heating with an oil bath. Distillation was continued until the temperature of the distillate reached 160 degrees centigrade. An orange colored oil remained which was cooled and an equal volume of technical hexane (essentially a mixture of methyl-substituted pentanes and n-hexane having a boiling range of 140–160 degrees Fahrenheit) was added (resulting in two liquid phases). Crystallization began after a short time, and more technical hexane was added in order to facilitate removal of the lumpy product from the flask. After filtering, the solids were triturated several times with small portions of ethanol, separated from the ethanol, and air-dried for two days. The product weighed 93.3 grams (87 percent).

It was dissolved in 600 milliliters of acetone, filtered, and 300 milliliters technical hexane added. After seeding, another 300 milliliters of technical hexane was added. After thirty minutes, heavy precipitation had taken place. The product was filtered, washed with a 1:1 mixture of acetone and technical hexane and dried at fifty degrees centigrade under partial vacuum. The yield of cycloheximide benzoylacetate was 54.7 grams (51 percent); the melting point was 148–149 degrees centigrade.

After concentration of the filtrate an additional twenty grams (18.7 percent) of product was recovered. Its melting point was 147–147.5 degrees centigrade.

A sample recrystallized from a 1:2 mixture of acetone and isopropyl ether melted at 148–149 degrees centigrade. Its specific rotation, $[\alpha]_D$, was plus 26 degrees (dimethyl sulfoxide).

*Analysis.*—Calc'd for $C_{24}H_{29}NO_6$: C, 67.43; H, 6.84; N, 3.28. Found: C, 67.68; H, 7.07; N, 3.31.

EXAMPLE 3

*Preparation of cycloheximide carbomethoxy-acetoacetate*

One hundred and fifty (150) milliliters of dimethyl β-oxoglutarate containing 28.1 grams (0.10 mole) of cycloheximide was heated over a steam bath for four hours. The excess β-keto ester was removed by distillation at 0.2 millimeter pressure. The residue (47 grams) was then chromatographed over 400 grams of Florisil (a magnesium silicate) in a 100 x 3.2 centimeter column. The column was saturated with technical hexane and a solution of the crude reaction product in 100 milliliters benzene was loaded on the column. Elution proceeded as follows:

| Fraction | Eluant | Volume (liters) | Weight of material (grams) |
|---|---|---|---|
| 1 | Technical hexane (TH) | 1 | 0.0 |
| 2 | 5% Acetone—TH | 2 | 0.0 |
| 3 | 10% Acetone—TH | 2 | 0.0 |
| 4 | 25% Acetone—TH | 4 | 8.0 (crystalline) |
| 5 | 50% Acetone—TH | 6 | 8.0 (orange oil) |
| 6 | Acetone | 4 | 5.7 |

Fraction 4 melted at 109–120 degrees centigrade. Upon recrystallization from acetone-isopropyl ether (1:5), the product melted at 130–132 degrees centigrade. A mixture with anhydrocycloheximide did not give a depressed melting point.

Fraction 5 was dissolved in acetone. The solution was filtered and the filtrate was evaporated to dryness at about 25 degrees centigrade and reduced pressure, cycloheximide carbomethoxyacetoacetate being thus obtained as an orange oil which was then dried in vacuo at 55 degrees centigrade. The specific rotation, $[\alpha]_D$, was plus 6 degrees (dimethyl sulfoxide).

*Analysis.*—Calc'd for $C_{21}H_{29}NO_8$: C, 59.56; H, 6.90; N, 3.31. Found: C, 59.99; H, 7.15; N, 3.47.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A lower-beta-keto ester having the following general structural formula:

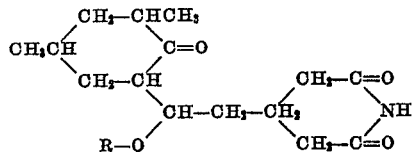

wherein R is a lower-beta-keto hydrocarboncarbonyl group containing not more than ten carbon atoms.

2. Cycloheximide actetoacetate.

3. Cycloheximide benzoylacetate.

4. Cycloheximide carbomethoxyacetoacetate.

5. A method of protecting plants from damage caused by fungal disease which comprises applying to said plants, in fungicidal toxic amount, lower-beta-keto ester of cycloheximide in a dispersed state.

6. A method of protecting plants from damage caused by fungal disease which comprises applying to the foliage of said plants, in fungicidal toxic amount, an aqueous spray containing lower-beta-keto ester of cycloheximide.

7. A method of protecting plants from damage caused by fungal disease which comprises applying to the foliage of said plants, in fungicidal toxic amount, an aqueous spray containing cycloheximide acetoacetate.

8. A composition for the control of plant disease fungi which comprises, as an essential active ingredient, lower-beta-keto ester of cycloheximide and a dispersible carrier therefor.

9. The composition of claim 8 wherein the dispersible carrier is a wettable inert powder.

10. A composition for the control of plant disease fungi which comprises, as an essential active ingredient, lower-beta-keto ester of cycloheximide dissolved in a water-miscible solvent.

11. A composition for the control of plant disease fungi which comprises, as an essential active ingredient, lower-beta-keto ester of cycloheximide dissolved in dimethylformamide.

12. A process for preparing lower-beta-keto hydrocarboncarboxylic acid esters of cycloheximide which comprises mixing and heating a lower-alkyl ester of lower-beta-keto hydrocarboncarboxylic acid with cycloheximide, and recovering the lower-beta-keto hydrocarboncarboxylic acid ester cyclohexemide thus formed.

13. The process of claim 12 wherein the ester reactant is ethyl acetoacetate.

14. The process of claim 12 wherein the ester reactant is ethyl benzoylacetate.

15. The process of claim 12 wherein the ester reactant is is dimethyl β-oxoglutarate.

16. A composition for the control of plant disease fungi which comprises as an essential active ingredient, cycloheximide acetoacetate in aqueous spray solution.

References Cited in the file of this patent

Ford: Jour. Am. Chem. Soc., vol. 70, pp. 1223–25 (1948).